United States Patent [19]

Onishi et al.

[11] Patent Number: 4,604,747
[45] Date of Patent: Aug. 5, 1986

[54] ERROR CORRECTING AND CONTROLLING SYSTEM

[75] Inventors: Ken Onishi, Kyoto; Masayuki Ishida, Nagaokakyo; Masakazu Shirozu, Osaka; Toshikatsu Takedomi, Urawa; Makoto Namekawa; Yukihiko Haikawa, both of Iwaki, all of Japan

[73] Assignees: Mitsubishi Denki Kabushiki Kaisha; Akai Electric Company Limited; Alpine Electronics, Inc., all of Tokyo, Japan

[21] Appl. No.: 609,854

[22] Filed: May 14, 1984

Related U.S. Application Data

[63] Continuation-in-part of Ser. No. 360,570, Mar. 22, 1982, abandoned.

[30] Foreign Application Priority Data

Mar. 25, 1981 [JP] Japan ................... 56-43475
Mar. 25, 1981 [JP] Japan ................... 56-43476

[51] Int. Cl.$^4$ ............................................. G06F 11/10
[52] U.S. Cl. .......................................... 371/37; 371/38
[58] Field of Search ................... 371/37, 38, 39, 40

[56] References Cited

U.S. PATENT DOCUMENTS 4,320,510  3/1982  Kojima ........................... 371/37
4,368,533  1/1983  Kojima ........................... 371/37

OTHER PUBLICATIONS

Patel et al., Optimal Rectangular Code for High Density Magnetic Tapes, IBM Journal of Research Developments, Nov. 1974, pp. 579-588.
STC-007 Consumer Use PCM Encoder-Decoder, Electronic Industries Assoc. of Japan, Jun. 1979.

*Primary Examiner*—Charles E. Atkinson
*Attorney, Agent, or Firm*—Wenderoth, Lind & Ponack

[57] ABSTRACT

An error correcting and controlling system forms syndromes $S_1$ and $S_2$ for each of a set of reproduced, sampled signal words and error correcting words P or Q and also forms a syndrome $S_i = S_1 \oplus T^{i-7} S_2$ by using the result of a CRC check of the set of sampled signal words. An error position i is determined by three zero counters which respectively indicate $S_1 \neq 0$, $S_2 \neq 0$ and $S_i \neq 0$. Alternatively, the system may further include three counters for respectively counting errors developed in the set of sampled signal words, and the error correcting words P and Q, the errors being detected by a CRC check circuit. When any one of the counters counts an error and the remaining counters count no error with $S_1 \neq 0$, $S_2 \neq 0$ and $S_i \neq 0$, a control signal is generated to perform a concealing operation, such as a means value interpolation, etc.

19 Claims, 6 Drawing Figures

ERROR CORRECTING AND CONTROLLING SYSTEM

This is a continuation-in-part of copending application Ser. No. 360,570, file Mar. 22, 1982 and now abandoned.

BACKGROUND OF THE INVENTION

This invention relates to a PCM decoder for reproducing an audio signal according to the PCM system through the utilization of a consumer cassette video system or one part thereof, and more particularly to an error correcting and controlling system used with such a PCM decoder.

According to the error correcting system for consumer PCM recorders, reproduced analog signals are sampled at sampling times T and converted to digital signals to generate a train of sampled signal words $A_0$, $B_0$, $A_1$, $B_1$, $A_2$, $B_n$, ..., $A_n$, $B_n$, $A_{n+1}$, $B_{n+1}$, ... The sampling is alternately effected on a pair of associated channels A and B with the sampling time of the channel B staggered from that of the channel A by one half the sampling time. For each set including six consecutive sampled signal words, one pair of error correcting words P and Q are formed in accordance with the following expressions:

$$P_n = A_n \oplus B_n \oplus A_{n+1} \oplus B_{n+1} \oplus A_{n+2} \oplus B_{n+2}$$

and $$Q_n = T^6 A_n \oplus T^5 B_n \oplus T^4 A_{n+1} \oplus T^3 B_{n+1} \oplus T^2 A_{n+2} \oplus T B_{n+2}$$

wherein the symbol $\oplus$ designates the modulo-2-addition, n is a multiple of three (3) and T designates a companion matrix of a polynominal $1+X^8+X^{14}$ or a Q generating matrix. The Q generating matrix may be expressed by:

$$T = \begin{bmatrix} 0 & 0 & 0 & 0 & 0 & 0 & 0 & 0 & 0 & 0 & 0 & 0 & 0 & 1 \\ & & & & & & & & & & & & & 0 \\ & & & & & & & & & & & & & 0 \\ & & & & & & & & & & & & & 0 \\ & & & & & & & & & & & & & 0 \\ & & & & & & & & & & & & & 0 \\ & & & & & & & & & & & & & 0 \\ & & & & I & & & & & & & & & 0 \\ & & & & & & & & & & & & & 1 \\ & & & & & & & & & & & & & 0 \\ & & & & & & & & & & & & & 0 \\ & & & & & & & & & & & & & 0 \\ & & & & & & & & & & & & & 0 \\ & & & & & & & & & & & & & 0 \end{bmatrix}$$

Then, the error correcting words $P_N$ and $Q_n$ thus formed are added to the mating set of six sampled signal words to form one data block composed of eight words. The eight words are interleaved and each interleaved word is combined with an error detecting word "CRC" to form a desired word assignment.

It is a common practice to calculate the error value included in data reproduced by the consumer PCM decoder as follows: Syndromes $S_1$ and $S_2$, respectively including error correcting words P and Q, are calculated in accordance with $$S_1 = A_n \oplus B_n \oplus A_{n+1} \oplus B_{n+1} \oplus A_{n+2} \oplus B_{n+2} \oplus P_n \quad (1)$$

and $$S_2 = T^6 A_n \oplus T^5 B_n \oplus T^4 A_{n+1} \oplus T^3 B_{n+1} \oplus T^2 A_{n+2} \oplus T B_{n+2} \oplus Q_n \quad (2)$$

By respectively substituting reproduced data $r_1$, $r_2$, $r_3$, $r_4$, $r_5$, $r_6$, $r_7$, and $r_8$ for $A_n$, $B_n$, $A_{n+1}$, $B_{n+1}$, $A_{n+2}$, $B_{n+2}$, $P_n$ and $Q_n$ in the expressions (1) and (2), $$S_1 = \sum_{m=1}^{7} r_m \quad (3)$$

and $$S_2 = \sum_{m=1}^{6} T^{7-m} r_m + r_8 \quad (4)$$

result, wherein a modulo-2-addition is effected.

Now assuming that in one data block a single error word exists at a error position i, where $1 \leq i \leq 6$, $$S_1 = e_i \quad (5)$$

and $$S_2 = T^{7-i} e_i \quad (6)$$

Thus, $e_1 = S_1$ results. The error position i included in any data block can be generally located through the cyclic redundancy check which is abbreviated as "CRC".

Then, assuming that a data block respectively includes two error words at positions i and j, where $i < j$ and $1 \leq i < j \leq 6$, $$S_1 = e_i \oplus e_j \quad (7)$$

and $$S_2 = T^{7-i} e_i \oplus T^{7-j} e_j \quad (8)$$

result. By solving the expressions (7) and (8) with respect to $e_j$ and $e_i$, $$e_j = (I \oplus T^{i-j})^{-1} (S_1 \oplus T^{i-7} S_2) = M_k (S_1 \oplus T^{i-7} S_2) \quad (9)$$

and $$e_i = S_1 \oplus e_j \quad (10)$$

are obtained, wherein I designates a unit matrix. Here $M_k = (I \oplus T^{i-j})^{-1}$ has five combinations of j and i with $k = j - i$ and therefore, five $M_k$'s are generally stored in an associated memory.

For $1 \leq i \leq 6$ and $j = 7$, one obtains $$S_1 = e_i \oplus e_7 \quad (11)$$

and $$S_2 = T^{7-i} e_i \quad (12)$$

and accordingly, $$e_i = T^{i-7} S_2 \quad (13)$$

results.

Also, for $1 \leq i \leq 6$ and $j = 8$, one obtains $$S_1 = e_i \quad (14)$$

and $$S_2 = T^{7-i} e_i \oplus e_8 \quad (15)$$

Therefore, $$e_1 = S_1 \quad (16)$$

results.

The technology and expressions as described above and as will be described later are described in detail, for example, in "STC-007, CONSUMER USE PCM ENCODER-DECODER", June 1976 Electronic Industries Association of Japan and in the A. M. Patel and S. J. Hong article entitled "Optimal Rectangular Code for High Density Magnetic Tapes", IBM JOURNAL OF RESEARCH DEVELOPMENTS, November 1974, pages 579 to 588. The pertinent portions of these references are incorporated by reference herein.

In a conventional error correcting device, reproduced data has been supplied to a first adder circuit and a P register so as to be converted into a syndrome $S_1$ through a modulo-2-addition. The calculated syndrome $S_1$ has been stored in the P register. Also, a first multiplier circuit multiplies the reproduced data by a multiplier $T^{-7}$ and then a second adder circuit, a second multiplier circuit and Q register which stores a syndrome $S_2$ are used to calculate $T^{i-7}S_2$ with an error position i supplied from a control circuit for calculating error positions i, j and k=j−i from the reproduced data after the "CRC". The calculated $T^{i-7}S_2$ has been added to the syndrome $S_1$ from the P register and then multiplied by $M_k$ in a third multiplier circuit, resulting in the calculation of the expression (9). Furthermore, a fourth adder circuit has added the syndrome $S_1$ from the P register to a product from the third multiplier, whereupon the expression (10) has been calculated.

The error position $e_i$ or error positions $e_i$ and $e_j$ thus calculated have been delivered to an output terminal or terminals assigned thereto and a correcting means has corrected an error word or words followed by the addition thereof to the reproduced data.

Conventional error correcting devices such as that described above have been disadvantageous in that an error or errors can not be detected and corrected in the case where the CRC has missed a single error word or in the case where a dropout compensating circuit is operated to replace more than one data block in video tape recorders.

Also, when the CRC detects not less than three error words in a data block, those error words can not be corrected. Under these circumstances, the control circuit might deliver a control signal to its assigned output terminal. That control signal has performed concealing operations such as the mean value interpolation, holding of the preceding word etc. Thus, when the control circuit detects one error word in a data block and the CRC has missed other error words, the error word is erroneously corrected, thereby resulting in the generation of clicks.

Accordingly, it is an object of the present invention to provide a new and improved and inexpensive error correcting and controlling system capable of detecting and correcting an error word or words which are missed by the CRC.

It is another object of the present invention to provide a new and improved error correcting and controlling system which is most suitable to the video tape recorder and which can correct an error that a dropout compensating circuit involved replaces entirely more than one data block.

It is still another object of the present invention to provide a new and improved error correcting and controlling system for causing a control circuit involved to generate a control signal for the concealing operation such as the mean value interpolation and preventing clicks from occurring upon an erroneous correction due to the presence of two error words one of which has been missed upon the CRC.

SUMMARY OF THE INVENTION

The present invention provides an error correcting and controlling system which is used with a PCM decoder and which comprises a first syndrome generator including a first adder and a P register which is connected and fed back to the first adder so as to generate a syndrome $S_1$ expressed by the abovementioned expression (1) from an error correcting word P and so as to generate sampled words $A_n$ to $A_{n+2}$ and $B_n$ to $B_{n+2}$ which are data to be reproduced (where n is an integer and designates a sampling time), a second syndrome generator including a first multiplier, a second adder, a second multiplier, and a Q register which are serially connected to one another, the Q register being fed back to the second adder, the second syndrome generator generating the product of a syndrome $S_2$ given by the abovementioned expression (2) which is multiplied by $T^{i-7}$ where $1 \leq i \leq 6$ from an error correcting word Q and the sampled words $A_n$ to $A_{n+1}$ and $B_{n+2}$, and a third syndrome generator consisting of a third adder connected to the outputs of the first and second syndrome generators so as to generate a syndrome $S_i$ given by $S_i = S_1 + T^{i-7}S_2$. The system further comprising a first, a second, and a third zero detector whose inputs are respectively connected to the P register, the Q register and the third adder and whose outputs are connected to a control circuit and the output of the Q register 2 being fed back to the input of the second adder. The first, second and third zero detectors respectively detect if $S_1$, $T^{i-7}S_2$ and $S_i$ are equal to zero. The control circuit receives a CRC signal and generates error position data which are supplied to a correction circuit. The correction circuit successively receives the sampled words and successively adds the sampled words to the corresponding error position and so as to successively form corrected sampled words.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

For a better understanding of the present invention, the description will now be made in conjuction with signal processing effected in accordance with the standards described in the above-mentioned STC-007 by a PCM recording and reproducing apparatus with reference to FIG. 6 of the drawings. The illustrated arrangement comprises a PCM recording system and a PCM reproducing system. The recording system shown in the upper portion of FIG. 6 comprises an input terminal 100 through which analog signals are supplied to a low pass filter 102 and after which the signals then sampled and then converted to digital signals by an analog-to-digital converter 104. The digital signals are successively supplied to an encoder 106 while at the same time are successively stored in a first memory 108 which is also connected to the encoder 106. The encoder 106 forms two error correcting words for each set of six sampled words and the correcting words are then also stored in the first memory 108.

The sampled words and the error correcting words stored in the first memory 108 are interleaved and then readout from the first memory 108 so as to each form set of eight words, that is, the six sampled words and the two error correcting words. These sets of eight words are successively supplied to a CRC imparting circuit 110 where each set of eight words are combined with a detecting CRC signal. Each set of eight words combined with the detecting CRC signal is added to a synchronizing signal by a synchronizing signal imparting circuit 112 and then recorded on an associated video tape recorder through an output terminal 114.

Figure 6:
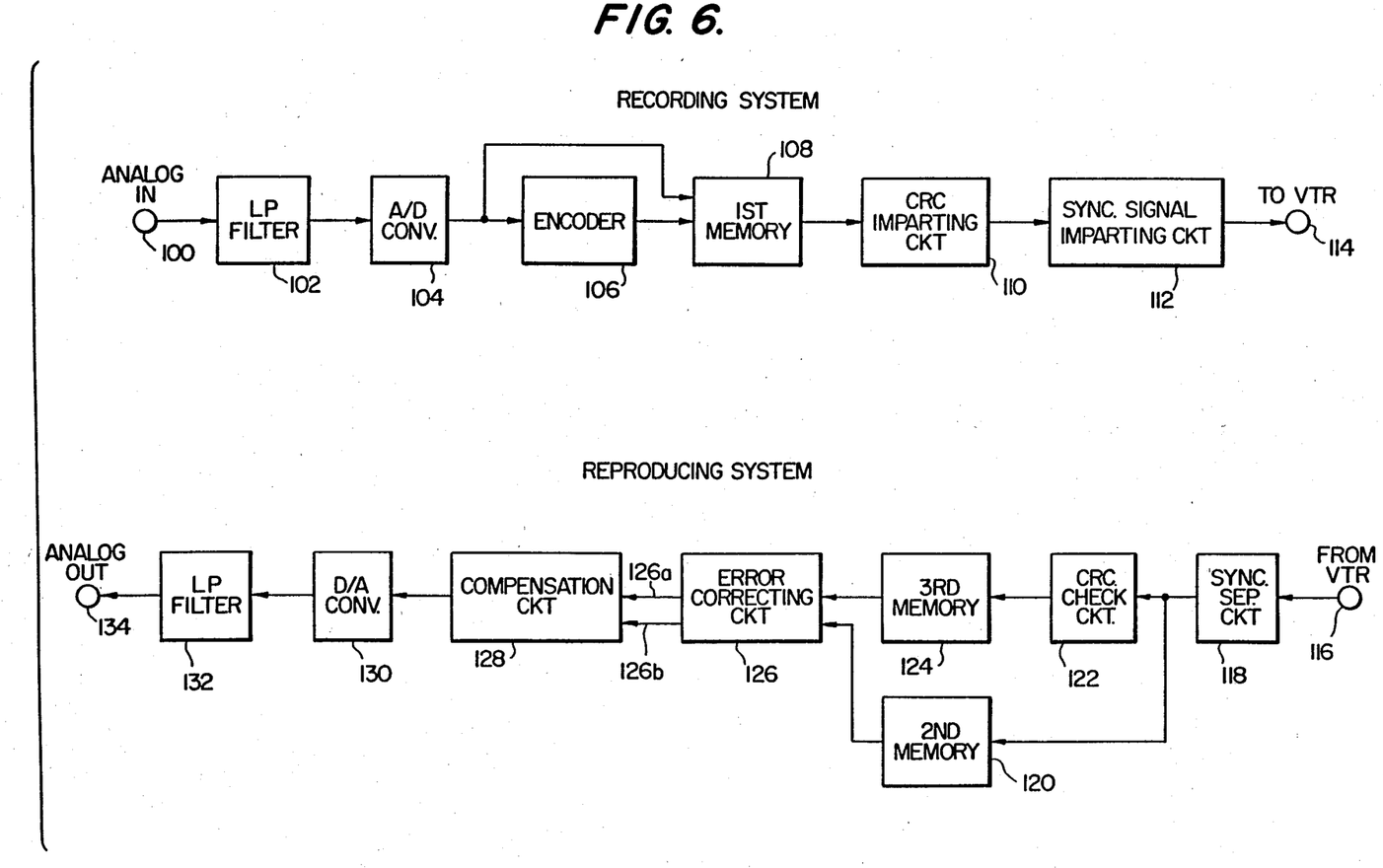
FIG. 6 is a block diagram of an outline of a signal processing system used with a PCM recording machine to which the present invention is applied.

Data thus recorded on the video tape recorder is read out by a reproducing system shown in the lower portion of FIG. 6.

Reproduced signals from the video tape recorder are supplied via an input terminal 116 to a synchronization separating circuit 118 where data is separated from the synchronizing signals. The separated data is stored in a second memory 120 and is also supplied to a CRC checking circuit 122 where the presence or absence of an error is determined. The result of this determination of CRC is stored in a third memory 124 so as to correspond to the data. The data de-interleaved and read out from the second memory 120 is supplied to an error correcting circuit 126 to which the result of the CRC from the third memory 124 corresponding to the data is also supplied. The error correcting circuit 126 calculates an error position or positions and an error value or values from the data and the results of the CRC supplied thereto so as to thereby convert the erroneous data to correct data. The error correcting circuit 126 supplies data 126a and a control signal 126b to a compensation circuit 128. The control signal 126b indicates the disabling of a correction. The data 126a without the control signal 126b is converted to an analog signal by a digital-to-analog converter 130. In the presence of the control signal 126b, the associated data is compensated as by the mean value interpolation and then are converted to an analog signal by the digital-to-analog converter 130. The converted analog signal passes through a low-pass filter 132 and is reproduced as the original analog signal at an output terminal 134.

The present invention concerns the error correcting circuit 126 and the compensation circuit 128 as described above.

Figure 1:
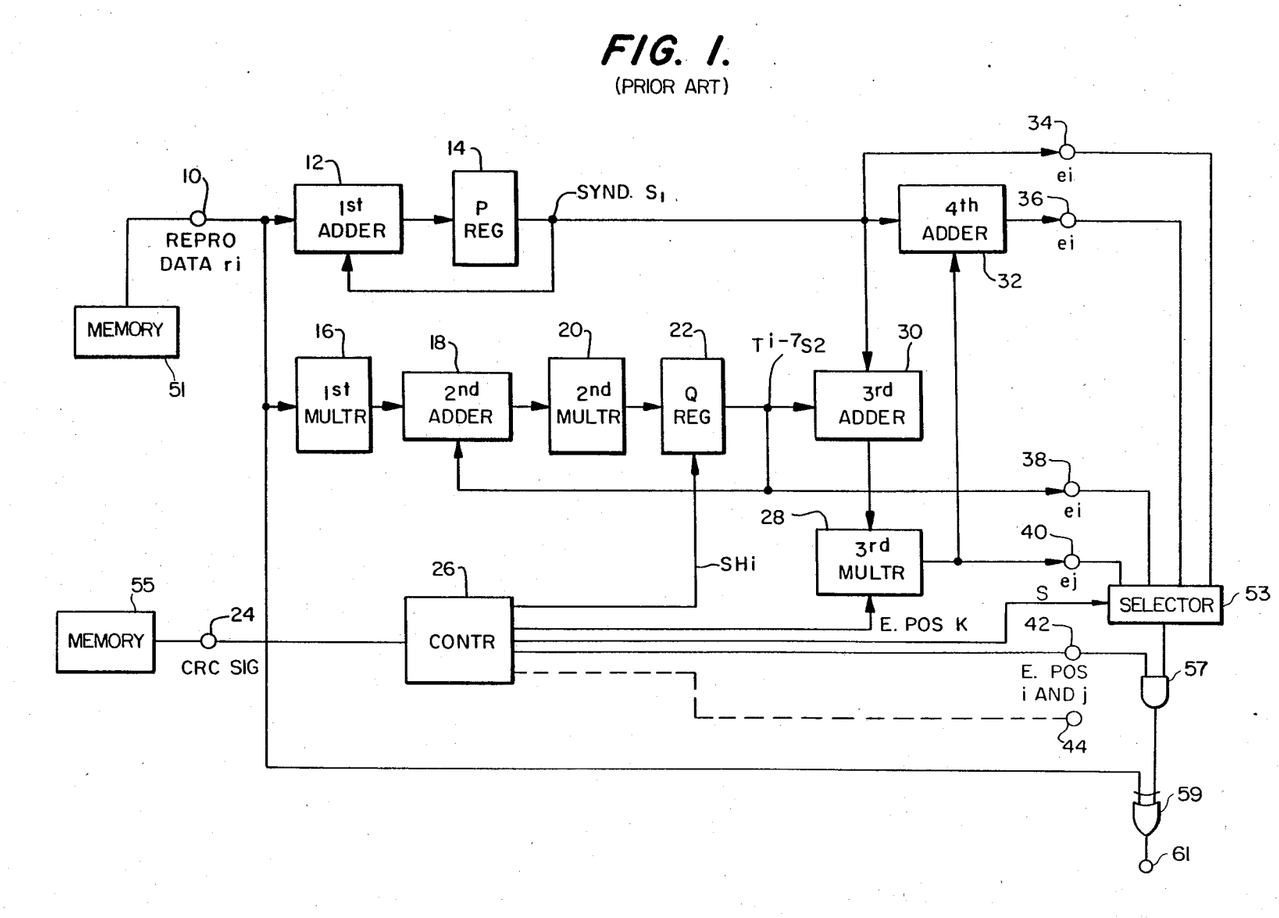
FIG. 1 is a block diagram of a conventional error correcting and controlling system.

Referring now to FIG. 1 of the drawings, there is illustrated a conventional error correcting and controlling system respectively relating to the error correction and compensation circuits 126 and 128. The illustrated arrangement comprises an input terminal 10 and a P register 14 connected to the first adder circuit 12 so as to store a syndrome $S_1$ therein, with an output thereof fed back to the first adder circuit 12.

The arrangment further comprises a first multiplier circuit 16 connected to the input terminal 10, a second adder circuit 18 connected to the first multiplier circuit 16, a second multiplier circuit 20 connected to the second adder circuit 18 and a Q register 22 connected to the second multiplier circuit 20 so as to store a syndrome $S_2$ therein with an output thereof fed back to the second adder circuit 18.

In addition, the arrangement comprises a memory 51 for storing the reproduced data therein, said memory 51 being connected to the input terminal 10, another memory 55 for storing the result of the CRC therein, said memory 55 being connected to another input terminal 24, and a control circuit 26 connected to the input terminal 24 and a third multiplier circuit 28 which is connected to the control circuit 26.

The Q register is connected to a third adder circuit 30 which is subsequently connected to the third multiplier 28 and the P register 14 is connected to both the third adder circuit 30 and a fourth adder circuit 32.

Then output terminals 34, 36, 38, 40 and 42 are respectively connected to the P register 14, the fourth adder circuit 32, the Q register 22, the third multiplier 28 and the control circuit 26. The control circuit 26 is also shown in FIG. 1 as being connected to an output terminal 44 through a dotted line. The output terminals 34, 36, 38, and 40 are also connected to a selector 53 having a setting inputs connected to the control circuit 26 and having an output connected to one input of an AND gate 57. The AND gate 57 has other input connected to the output terminal 42 and has its output connected to one input of an EXCLUSIVE OR gate 59 having its other input connected to the input terminal 10 and having an output terminal 61.

The arrangement of FIG. 1 operates as follows: The input terminal 10 receives reproduced data $r_i$ and the first adder circuit 12 and the P register 14 produce a syndrome $S_1$ which is, in turn, stored in the P register 14. At that time, the first adder circuit 12 effects the summation with modulo-2-addition. The first adder circuit 12 is preferably formed of a plurality of EXCLUSIVE OR circuits.

Then, in order to calculate the expression (9), $T^{i-7}S_2$ is first calculated. To this end, the first multiplier circuit 16 multiplies the reproduced data $r_i$ by a multplier $T^{-7}$ and then the second adder circuit 18, the second multiplier circuit 20 and the Q register 22 calculate the $T^{i-7}S_2$ with an error position i supplied to the Q register 22 from the control circuit 26. A syndrome $S_2$ is stored in Q register 22 and an output $T^{i-7}S_2$ from the Q register 22 is added to an output $S_1$ from the P register 14 by means of the third adder circuit 30. The third multiplier circuit 28 multiplies the sum of the two outputs from the third adder circuit 30 by a multiplier $M_k$, where $k=j-i$, resulting in the calculation of the expression (9).

The fourth adder circuit 32 also adds the output $S_1$ from the P register 14 to that from the third multiplier circuit 28 to calculate the expression (10).

The control circuit 26 is responsive to a signal indicating the result of the CRC to selectively generate error positions i, j and k equal to i−j. The error positions i and j are delivered to the output terminal 42 and the error position k is supplied to the third multiplier circuit 28.

The error position i or the error positions i and j thus calculated are delivered to an output terminal 34 or 36 or the output terminals 38 and 40 assigned thereto in accordance with the particular error status.

The selector 53 selects the output terminals 34, 36, 38 and 40 or the error in accordance with the particular error status. On the other hand, the reproduced words are successively read out from the memory 51 and may include an error word or words. The error word or words is or are determined by the error positions i and j developed at the output terminal 42 and are passed through the AND gate 57. Then, the EXCLUSIVE OR gate 59 adds the error word or words to the corresponding reproduced word or words to form a corrected word or words which is developed at the output terminal 61.

Conventional error correcting and controlling system such as those described above have been disadvantageous in that no error can be detected and corrected in the case the CRC misses one error word or in the case the dropout compensating circuit is operated to entirely replace more than one data block in video tape recorders.

Figure 2:
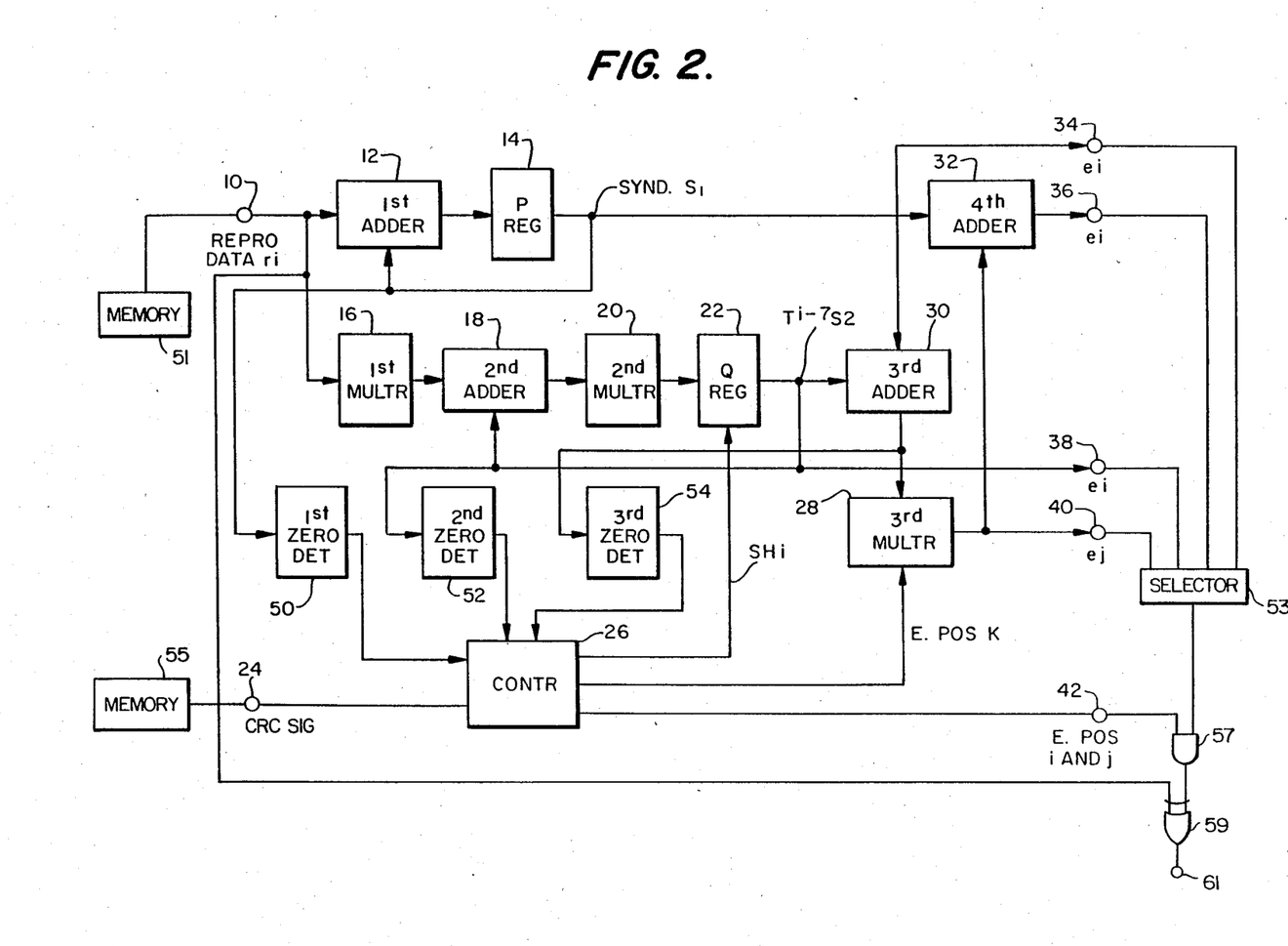
FIG. 2 is a block diagram of one embodiment according to the error correcting and controlling system of the present invention.

Also, when the CRC detects not less than three error words in a data block, those error words cannot be corrected. The number of those error words is hereinafter called the number of CRC pointers. Under these circumstances, the control circuit 26 delivers a control signal to the output terminal 44 resulting in concealing operations such as the mean value interpolation, holding of the preceding word, etc. This has resulted in the disadvantage that, when the CRC misses one error word with one CRC pointer, an erroneous correction is effected to generate clicks. Referring now to FIG 2, wherein like reference numerals designate the components identical or corresponding to those shown in FIG. 1, there is illustrated one embodiment according to the error correcting system of the present invention. The illustrated arrangement is different from that shown in FIG. 1 only in that in FIG. 2, a first, second and third zero detector circuits 50, 52 and 54 have their inputs respectively connected to the first adder circuit 12 and the P register 14, the second adder circuit 18 and the Q register 22, and the third adder circuit 30 and have their outputs connected to the control circuit 26. The control circuit is different from that shown in FIG. 1 in that the output terminal 44 has been omitted.

The first, second and third zero detector circuits 50, 52 and 54 respectively detect if $S_1$, $T^{i-7}S_2$ and $S_i$ are respectively equal to zero and the control circuit 26 controls the error positions.

It is noted that for $T^{i-7}S_2=0$, $S_2=0$ provided that $T^{i-7}\neq 0$ and $1\leq i\leq 6$. Thus, the second zero detector 52 detects that $S_2$ is equal to zero.

With one error word, the expressions (5) and (6) give $$S_2 = T^{7-i}S_1 \tag{17}$$

and $$S_2 T^{7-i} = S_1 \text{ or } T^{i-7}S_2 = S_1$$

respectively. Thus $$S_1 \oplus T^{i-7}S_2 = 0 \tag{18}$$

results. It is here seen that the lefthand side of the expression (18) is equal to the second term on the righthand side of the expression (9). Accordingly, by detecting the output from the third adder circuit 30 by means of the third zero detector circuit 54, a position of an error word can be located and the error words can be corrected. In the illustrated example, the zero detector circuit may be simply composed of an OR circuit with fourteen parallel inputs or a D-FLIP-FLOP circuit with a series input and an initial resetting input.

Figure 3:
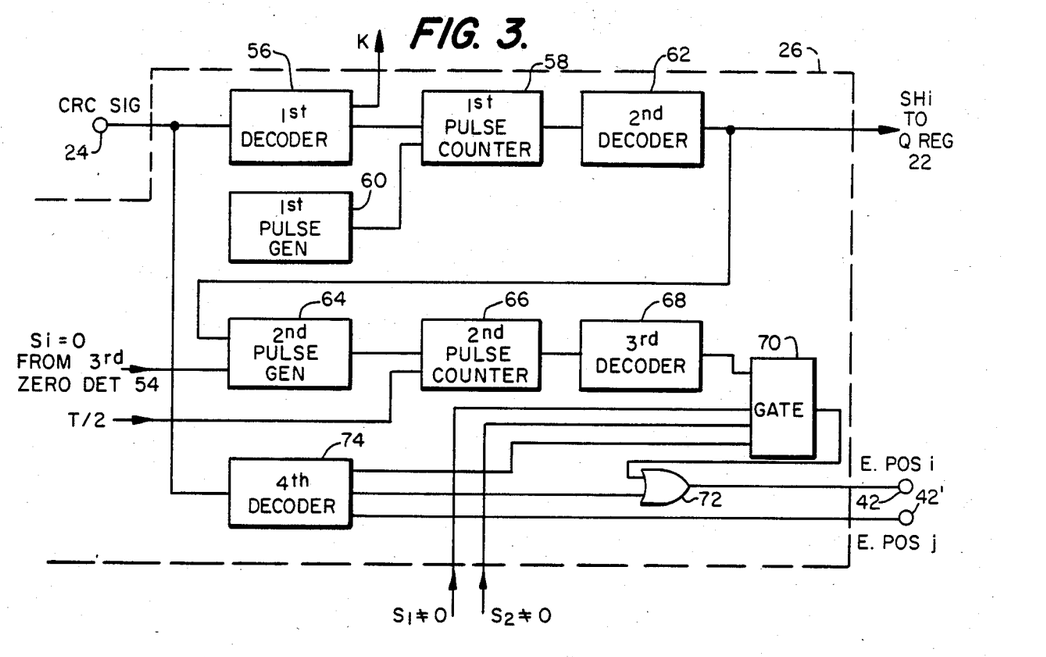
FIG. 3 is a block diagram of the details of the control circuit shown in FIG. 2.

The control circuit 26 has, by way of example, a circuit configuration as shown in FIG. 3. The illustrated arrangement comprises a first decoder 56 connected to the input terminal 24 for the CRC signal so as to generate pulses for error positions i and k, a first pulse counter 58 connected to the first decoder 56 to count i pulses and also to a first pulse generator 60 for generating m pulses where m ≧ 7. The pulse counter 58 is connected to a second decoder 62 for generating i pulses missed by the CRC. The second decoder 62 delivers a signal $SH_i$ to the Q register 22 which is required after all the reproduced data $r_i$ has been entered into the first adder circuit 12. To this end, the first pulse counter 58 counts the i pulses up once and then counts them down with the m pulses from the first pulse generator 60, whereby the second decoder 62 generates i pulses which form the signal $SH_i$.

The second decoder 62 has its output connected to a second pulse generator 64 for generating the i pulses missed by the CRC. The second pulse generator 64 has its output connected to a second pulse counter 66 for counting the i missed pulses. Furthermore, the second pulse counter 66 is connected to a third decoder 68 for detecting a missed word. The third decoder 68 is connected to one input of a gate circuit 70 having its output connected to one input of an OR circuit 72 which is subsequently connected to the output terminal 42 for the error position i.

Furthermore, a fourth decoder 74 has its input connected to the input terminal 24 for the CRC signal and has three outputs connected to another input of the gate circuit 70, the other input of the OR circuit 72 and an output terminal 42' for the error position j.

When the CRC misses pulses, the second decoder 62 generates the m pulses and the second pulse generator 64 permits i pulses allowing $S_i=0$ to pass therethrough, resulting in the generation of i pulses. The second pulse counter 66 counts those pulse up and then down with pulses having a pulse repetition period T/2 equal to one half the sampling time T and supplied thereto until the third decoder 68 detects a zero output from the second pulse counter 66. At that time, the gate circuit 70 responds to inputs $S_i\neq 0$ and $S_2\neq 0$ supplied to the remaining inputs thereto and the number of the CRC pointer being equal to zero from the decoder 74 so as to pass an output from the fourth decoder 68 therethrough. The OR circuit 72 adds that output to i due to the CRC pointer from the fourth decoder 74 after which the resulting error position i is delivered to the output terminal 42.

It is recalled that $m \geq 7$. This is because $m \geq 7$ can be utilized to respectively detect zero outputs from the pulse counters 58 and 66 by their corresponding decoders 62 and 68.

The use of $m=7$ is particularly advantageous in that each of the first and second counters 58 or 66 is required only to include three bit positions.

From the foregoing it is seen that the embodiments of the present invention shown in FIG. 2 and 3 can detect $S_i=0$ so as to detect a word missed by the CRC with an inexpensive structure.

Figure 4:
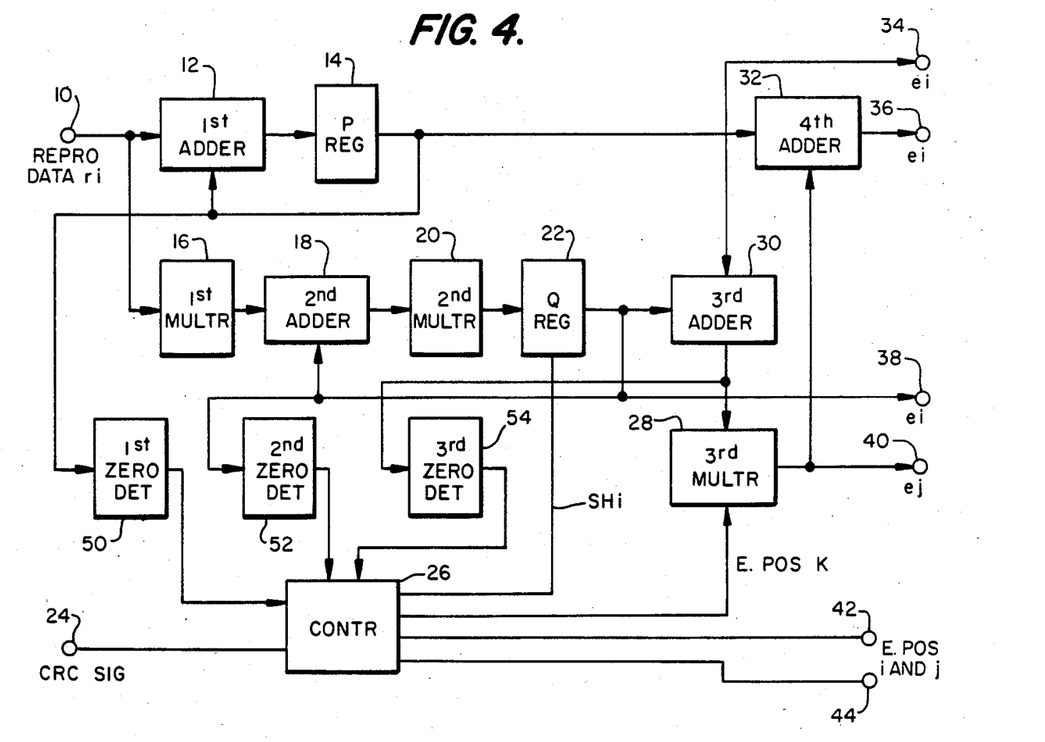
FIG. 4 is a diagram similar to FIG. 2 but illustrates a modification of the present invention.

In FIG. 4 wherein like reference numerals designate the components identical or corresponding to those shown in FIG. 2 there is illustrated a modification of the another aspect of the present invention further including an error controlling unit. The illustrated arrangement is different from that shown in FIG. 2 only in that in FIG. 4, an output terminals 44 is connected to the control circuit 26 which, in turn, determines whether or not an error or errors can be corrected, in addition to the calculation of the error position or positions.

As described above in conjunction with FIG. 2, the presence of a single error word results in the equality of the lefthand side of the expression (18) to the second term on the righthand side of the expression (9). Therefore, it is seen that an output from the third zero detector circuit 54 is always equal to zero in the presence of a single error word. Therefore, under conditions that the six sampled signal words have one CRC pointer and $S_1 \neq 0$, $S_2 \neq 0$ and $S_i \neq 0$, the control circuit 26 generates a control signal even though the CRC would have missed an error word or words. This is true under the conidtions that an error correcting word P has one CRC pointer and $S_1 \neq 0$, $S_2 \neq 0$ and $S_i \neq 0$ and under the conditions that an error correcting word Q has one CRC pointer and $S_1 \neq$, $S_2 \neq 0$ and $S_i \neq 0$. The conditions as described above are listed in the following Table:

TABLE

| | Number of CRC Pointers | | | | | |
|---|---|---|---|---|---|---|
| Condi- tions | Six Sampled Signal Words | Error Correcting Word P | Error Correcting Word Q | $S_1$ | Syndrome $S_2$ | $S_i$ |
| 1 | 1 | 0 | 0 | $\neq 0$ | $\neq 0$ | $\neq 0$ |
| 2 | 0 | 1 | 0 | $\neq 0$ | $\neq 0$ | $\neq 0$ |
| 3 | 0 | 0 | 1 | $\neq 0$ | $\neq 0$ | $\neq 0$ |

Figure 5:
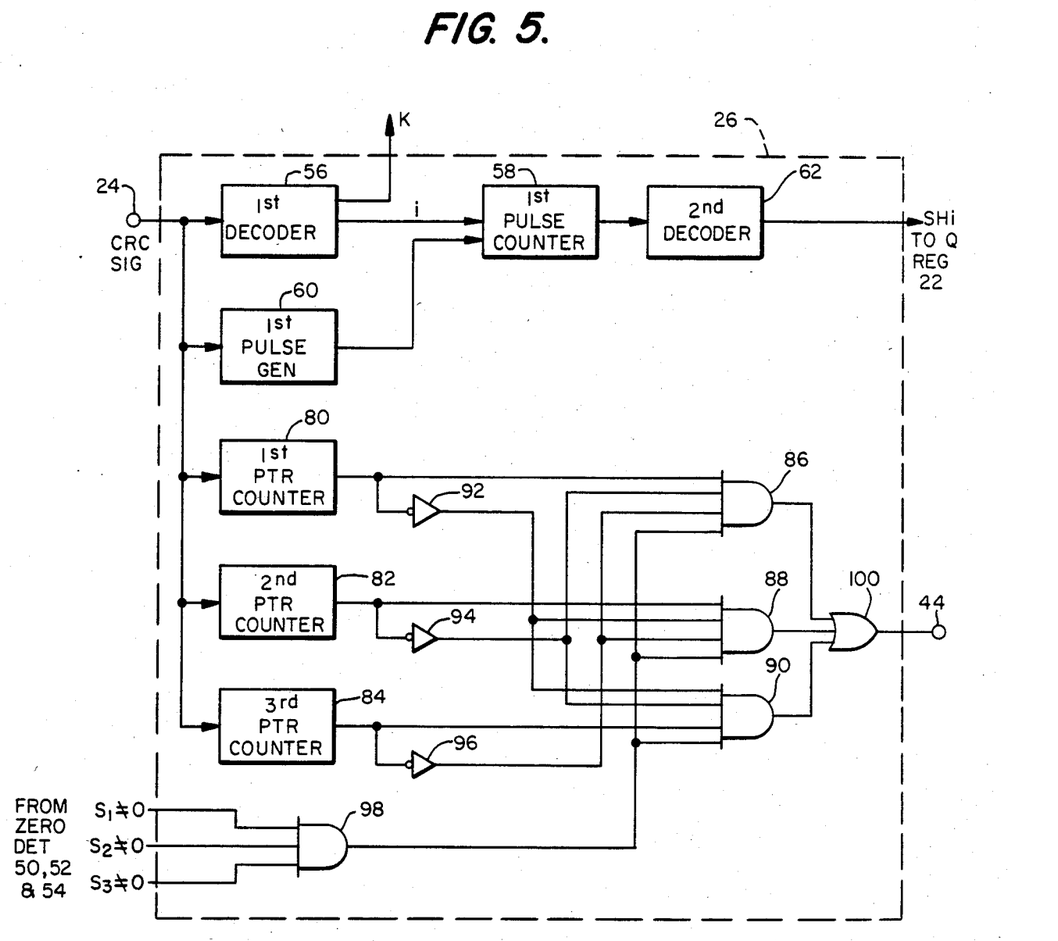
FIG. 5 is a block diagram of the details of the control circuit shown in FIG. 4.

The control circuit 26 shown in FIG. 4 has, by way of example, a circuit configuration as illustrated in FIG. 5, wherein like reference numerals designate the components identical to those shown in FIG. 3. The illustrated arrangement comprises, in addition to the first decoder 56, the first pulse counter 58, the first pulse generator 60 and the second decoder 62 as described above, first, second, and third pointer counters 80, 82 and 84 connected together to the input terminal 24 for the CRC signal so as to respectively count the number of CRC pointers included in the set of six sampled signal words, error correcting word P and error correcting word Q. Each of the pointer counters 80, 82 and 84 has its output directly connected to one input of a different one of three AND circuit 86, 88 or 90 and also via corresponding inverters 92, 94 or 96 to the other inputs of the remaining AND circuits. For example, the first pointer counter 80 has its output connected to one input of the AND circuit 86 and via the invert 94 to the inputs of the AND circuit 88 and 90. Then, another AND circuit 98 has its three inputs respectively supplied with syndromes $S_1$, $S_2$ and $S_i$ which are not equal to zero and has its output connected to the remaining inputs of the AND circuits 86, 88 and 90. Then, the AND circuit 86, 88 and 90 have their outputs connected to the three inputs of an OR circuit 100 having its output connected to the output terminal 44.

When the pointer counters 80, 82 and 84 count the respective number of the CRC pointers specified by any one of the conditions 1, 2 or 3 listed in the above Table and the AND circuit 98 simultaneously receives the syndromes of $S_1 \neq 0$, $S_2 \neq 0$ and $S_i \neq 0$, that counter counting one CRC pointer generates a logic value of ONE. Thus, that AND circuit having one input directly connected to that counter delivers that logic value of ONE to the output terminal 44 through the OR circuit 100 as a control signal for the mean value interpolation, etc. For example, when the CRC pointer counter 80 receives six sampled signal words to give the total number of the CRC pointers equal to one, the counter delivers a logic value of ONE to the output terminal 44 through the CRC circuit 100 as the control signal.

From the foregoing it is seen that the modification of the present invention shown in FIGS. 4 and 5 can detect $S_1=0$, $S_2=0$ and $S_i=0$ to thereby detect that the CRC has missed an error word or words and to generate a control signal. Thus, it can prevent the occurrence of clicks due to the missing by the CRC. Also, an inexpensive structure results.

While the present invention has been illustrated described in conjunction with a few preferred embodiments thereof it is to be understood that numerous changes and modifications may be resorted without departing from the spirit and scope of the present invention.

What is claimed is:

1. An error correcting and controlling system used with a PCM decoder and comprising:
    (a) first syndrome generator means for generating a syndrome $S_1$ given by the subsequently mentioned expression (1) on the basis of an error correcting word P and sampled words $A_n$ to $A_{n+2}$, and $B_n$ to $B_{n+2}$ which comprise data to be reproduced;
    (b) a second syndrome generator means for generating the product of a $T^{i-7}$ and a syndrome $S_2$ given by the subsequently mentioned expression (2) on the basis of an error correcting word Q and said sampled words $A_n$ to $A_{n+2}$, and $B_n$ to $B_{n+2}$;
    (c) a third syndrome generator means operatively connected to said first and second syndrome generator means and consisting of an adder used to generate a syndrome $S_i$ given by the subsequently mentioned expression (3) on the basis of outputs from said first and second syndrome generator means;
    (d) a first detector means operatively connected to said second syndrome generator means for detecting $S_1=0$ and $T^{i-7}S_2=0$ with respect to the $S_i$ and $T^{i-7}$ respectively forming said outputs from said first and second syndrome generator means;
    (e) a CRC checking means for detecting whether error correcting words P and Q and said sampled words $A_n$ to $A_{n+2}$ and $B_n$ to $B_{n+2}$ are correct or erroneous and for delivering CRC pointer signals in accordance with said error correcting words and said sampled words on the basis of the result of said detection;
    (f) a decoder means operatively connected to said CRC checking means for decoding the number of CRC pointers on the basis of said CRC pointer signals from said CRC checking means in accordance with said error correcting words and said sampled words;

(g) a second detector means for detecting a value of i rendering $S_i$ equal to zero, $S_i$ corresponding to the product of an output from said second syndrome generator means multiplied by $T_i$ times through a feedback loop connected thereto, wherein $1 \leq i \leq 6$; and (h) a correcting means for effecting error correction by adding said syndrome $S_1$ to an i-th sampled word with a modulo 2 addition upon the detection of a value of i from said second detector means when the number of CRC pointers is equal to zero, and $S_1 \neq 0$ and $T^{i-7}S_2 \neq 0$, wherein the expressions (1), (2) and (3) are given by:

$$S_1 = A_n \oplus B_n \oplus A_{n+1} \oplus B_{n+1} \oplus A_{n+2} B_{n+2} \oplus P_n$$

$$S_2 = T^6 A_n \oplus T^5 B_n \beta T^4 A_{n+1} \oplus T^3 B_{n+1} \oplus T^2 A_{n+2} \oplus T B_{n+2} \oplus Q_n$$

and $$S_i = S_1 \neq T^{i-7} S_2$$

respectively, $A_n$, $A_{n+1}$ and $A_{n+2}$ designate sampled signal words which are sampled on one of two channels at sampling times and alternating sampled signal words $B_n$, $B_{n+2}$ sampled on the other channel at the common sampling times staggered from the corresponding sampling times for $A_n$, $A_{n+1}$ and $A_{n+2}$ by one half the sampling time, n is an integer and designates a sampling time point, i is an integer and $1 \leq i \leq 6$, T designates a Q generating matrix given by:

$$T = \begin{bmatrix} 0 & 0 & 0 & 0 & 0 & 0 & 0 & 0 & 0 & 0 & 0 & 0 & 1 \\ & & & & & & & & & & & & 0 \\ & & & & & & & & & & & & 0 \\ & & & & & & & & & & & & 0 \\ & & & & & & & & & & & & 0 \\ & & & & & & & & & & & & 0 \\ & & & & I & & & & & & & & 0 \\ & & & & & & & & & & & & 0 \\ & & & & & & & & & & & & 1 \\ & & & & & & & & & & & & 0 \\ & & & & & & & & & & & & 0 \\ & & & & & & & & & & & & 0 \\ & & & & & & & & & & & & 0 \end{bmatrix}$$

where I designates a thirteenth order unit matrix, and the number of CRC pointers is defined to be equal to the number of error correcting words detected by said checking means CRC from among eight words.

2. An error correcting and controlling system as claimed in claim 1, wherein said first syndrome generator means includes a first adder, and a register having its output connected to said first adder through a feedback loop, said register storing an output from said first adder.

3. An error correcting and controlling system as claimed in claim 3, wherein said second syndrome generator means includes a multiplier, an adder and a register, said register having its output connected to said adder through a feedback loop.

4. An error correcting and controlling system as claimed in claim 1, wherein said second syndrome generator means includes a first multiplier, a second adder connected to the output of said first multiplier, a second multiplier connected to the output of said second adder, and a register connected to the output of said second multiplier, said register having its output connected to an input of said second adder.

5. An error correcting and controlling system as claimed in claim 1, wherein there is further provided a third adder for adding outputs from said first and second syndrome generator means together.

6. An error correcting and controlling system used with a PCM decoder and comprising:

(a) a first syndrome generator means for generating a syndrome $S_1$ given by the subsequently mentioned expression (1) on the basis of an error correcting word $P_1$, sampled words $A_n$ to $A_{n+2}$, and $B_n$ to $B_{n-2}$ which comprise data to be reproduced;

(b) a second syndrome generator means for generating the product of a $T^{i-7}$ and a syndrome $S_2$ given by the subsequently mentioned expression (2) on the basis of an error correcting word Q and said sampled words $A_n$ to $A_{n+2}$ and $B_n$ to $B_{n+2}$;

(c) a third syndrome generator means operatively connected to said first and second syndrome generator means and consisting of an adder used to generate a syndrome $S_i$ given by the subsequently mentioned expression (3) on the basis of outputs from said fist and second syndrome generator means;

(d) a first detector means operatively connected to said first and second syndrome generator means for detecting $S_1 = 0$ and $T^{i-7}S_2 = 0$ with respect to the $S_1$ and $T^{i-7}$ respectively forming said outputs from said first and second syndrome generator means;

(e) a CRC checking means for detecting whether error correcting words P and Q and said sampled words $A_n$ to $A_{n+2}$ and $B_n$ to $B_{n+2}$ are correct or erroneous and for delivering CRC pointer signals in accordance with said error correcting words and said sampled words on the basis of the result of said detection;

(f) a decoder means operatively connected to said CRC checking means for decoding the number of CRC pointers on the basis of said CRC pointer signals from said CRC checking means in accordance with the error correcting words and said sampled words;

(g) a second detector means for detecting a value of i rendering $S_i$ equal to zero, $S_i$ corresponding to the product of an output from said second syndrome generator means multiplied by T i times through a feedback loop connected thereto, wherein $1 \leq i \leq 6$;

(h) a correcting means for effecting error correction by adding said snydrome $S_1$ to an i-th sampled word with a modulo 2 addition upon the detection of a value of i from said second detector means when the number of CRC pointers is equal to zero, and $S_1 \neq 0$ and $T^{i-7}S_2 \neq 0$;

(i) a first pulse generator means for generating m pulses, wherein $m \leq 7$;

(j) a second pulse generator means for generating i pulses, wherein $S_i = 0$ among said m pulses;

(k) a down counter means for counting a pulse down at each of sampling time points; and (l) a third detector means for detecting a time point where i pulses have been counted down whereby a word at said detected time point is corrected, wherein said expressions (1), (2) and (3) are given by:

$$S_1 = A_n \oplus B_n \oplus A_{n+1} \oplus B_{n+1} \oplus A_{n+2} B_{n+2} \oplus P_n$$

$$S_2 = T^6 A_n \oplus T^5 B_n \oplus T^4 A_{n+1} \oplus T^3 B_{n+1} \oplus T^2 A_{n+2} \oplus T B_{n+2} \oplus Q_n$$

and $$S_i = S_1 \oplus T^{i-7} S_2$$

respectively, $A_n$, $A_{n+1}$ and $A_{n+2}$ designate sampled signal words sampled on one of two channels at sampling time and alternating sampled signal words $B_n$, $B_{n+1}$ and $B_{n+2}$ sampled on the other channel at the common sampling times staggered from the corresponding sampling times for $A_n$, $A_{n+1}$ and $A_{n+2}$ by one half the sampling time, n is an integer and designates a sampling time point, i is an integer and $1 \leq i \leq 6$, T designates a Q generating matrix given by:

$$T = \begin{bmatrix} 0 & 0 & 0 & 0 & 0 & 0 & 0 & 0 & 0 & 0 & 0 & 0 & 1 \\ & & & & & & & & & & & & 0 \\ & & & & & & & & & & & & 0 \\ & & & & & & & & & & & & 0 \\ & & & & & & & & & & & & 0 \\ & & & & & & & & & & & & 0 \\ & & & & & & & & & & & & 0 \\ & & & & I & & & & & & & & 0 \\ & & & & & & & & & & & & 1 \\ & & & & & & & & & & & & 0 \\ & & & & & & & & & & & & 0 \\ & & & & & & & & & & & & 0 \\ & & & & & & & & & & & & 0 \end{bmatrix}$$

where I designating a thirteenth order unit matrix, and the number of CRC pointers is defined to be equal to the number of error correcting words detected by the CRC from among eight words.

7. An error correcting device as claimed in claim 6, wherein said second pulse generator means includes a first counter having supplied thereto i pulses which are decoded with CRC pointer signals and an output from said first pulse generator means, and first pulse decoder for decoding an output from said first counter.

8. An error correcting and controlling system as claimed in claim 6, wherein said second detector means is formed of a second pulse generator circuit having supplied thereto an output from said second pulse generator means and a detecting signal from said first detector means indicating that $S_i = 0$ and delivering i pulses missed by said CRC checking means.

9. An error correcting device as claimed in claim 6, wherein said down counter means is formed of a second pulse counter having supplied thereto said i pulses missed by said CRC checking means from said second detector means and a periodic signal having a pulse repetition period equal to one half of a sampling period T and wherein said down counter means counts said i missed pulses down with said synchronizing signal.

10. An error correcting and controlling system as claimed in claim 6, wherein said third detector means decodes an output from said down counter means.

11. An error correcting and controlling system as claimed in claim 6, wherein said third detector means includes a decoder circuit for decoding said CRC pointer signals, a gate circuit gated with $S_1 \neq 0$, $S_2 \neq 0$ and the number of CRC pointers which are equal to zero and an OR circuit for mixing an output from said decoder circuit with an output from said gate circuit to deliver an error position signal i.

12. An error correcting and controlling system used with a PCM decoder and comprising:
(a) a first syndrome generator means for generating a syndrome $S_1$ given by the subsequently mentioned expression (1) on the basis of an error correcting word P and sampled words $A_n$ to $A_{n+2}$ and $B_n$ to $B_{n+2}$ which comprise data to be reproduced;
(b) a second syndrome generator means for generating the product of a $T^{i-7}$ and a syndrome $S_2$ given by the subsequently mentioned expression (2) on the basis of an error correcting word Q and said sampled words $A_n$ to $A_{n+2}$ and $B_n$ to $B_{n+2}$;
(c) a third syndrome generator means operatively connected to said first and second syndrome generator means and consisting of an adder used to generate a syndrome $S_i$ given by the subsequently mentioned expression (3) on the basis of outputs from said first and second syndrome generator means;
(d) a first detector means operatively connected to said first and second syndrome generator means for detecting $S_1 = 0$ and $T^{i-7} S_2 = 0$ with respect to the $S_1$ and $T^{i-7}$ respectively forming said outputs from said first and second syndrome generator means;
(e) a CRC checking means for detecting whether error correcting words P and Q and said sampled words $A_n$ to $A_{n+2}$ and $B_n$ to $B_{n+2}$ are correct or erroneous and for delivering CRC pointer signals in accordance with said error correcting words and said sampled words on the basis of the result of said detection;
(f) a decoder means operatively connected to said CRC checking means for decoding the number of CRC pointers on the basis of said CRC pointer signals from said CRC checking means in accordance with said error correcting words and said sampled words; and
(g) a means for generating an identification signal for disabling of the error correction under the conditions that a single CRC pointer is generated for any one of said sampled signal words and said error correction words P and Q while the remaining CRC pointers and equal to zero and each of the syndromes $S_1$, $S_2$ and $S_i$ is not equal to zero, wherein the expressions (1), (2) and (3) are given by:

$$S_1 = A_n \oplus B_n \oplus A_{n+1} \oplus B_{n+1} \oplus A_{n+2} \oplus B_{n+2} \oplus P_n$$

$$S_2 = T^6 A_n \oplus T^5 B_n \oplus T^4 A_{n+1} \oplus T^3 B_{n+1} \oplus T^2 A_{n+2} \oplus T B_{n+2} \oplus Q_n$$

and $$S_i = S_1 \oplus T^{i-7} S_2$$

respectively, $A_n$, $A_{n+1}$ and $A_{n+2}$ designate sampled signal words which are sampled on one of two channels at sampling times and alternating sampled signal words $B_n$, $B_{n+1}$ and $B_{n+2}$ sampled on the other channel at the common sampling times for $A_n$, $A_{n+1}$ and $A_{n+2}$ by one half the sampling time, n is an integer and designates a sampling time point, i is an integer and $1 \leq i \leq 6$, T designates a Q generating matrix given by:

$$T = \begin{bmatrix} 0\,0\,0\,0\,0\,0\,0\,0\,0\,0\,0\,0\,1 \\ & & 0 \\ & & 0 \\ & & 0 \\ & & 0 \\ & & 0 \\ & & 0 \\ & I & 0 \\ & & 1 \\ & & 0 \\ & & 0 \\ & & 0 \\ & & 0 \\ & & 0 \end{bmatrix}$$

where I designates a thirteenth order unit matrix, and the number of CRC pointers is defined to be equal to the number of error correcting words detected by said CRC checking means from among eight words.

13. An error correcting and controlling system as claimed in claim 12, wherein said decoder means includes a control means for detecting the missing of an error word or words by said CRC checking means so as to deliver said control signal.

14. An error correcting and controlling system as claimed in claim 12, wherein said control means has a CRC signal, a detecting signal from said first detector means indicating that $S_1=0$, $T^{i-7}S_2=0$ and $S_i=0$ and delivers an error position signal.

15. An error correcting and controlling system as claimed in claim 12, wherein said control means includes three CRC pointer counters for counting the number of CRC pointers respectively included in a set of six sampled signal words and said error correcting words P and Q.

16. An error correcting and controlling system as claimed in claim 13, wherein said first syndrome generator means includes a first adder and a register having an output connected to said first adder through a feedback loop, said register storing an output from said first adder.

17. An error correcting and controlling system as claimed in claim 13, wherein said second syndrome generator means includes a multiplier, an adder and a register connected to one another, said register having an output connected to said adder through a feedback loop.

18. An error correcting and controlling system as claimed in claim 13, wherein said second syndrome generator means includes a first multiplier, a second adder connected to an output of said first multiplier, a second multiplier connected to an output of said second adder and a register connected to an output of said second multiplier, an output of said register being connected to an input to said second adder.

19. An error correcting and controlling system as claimed in claim 12, wherein said first generator means includes a third adder circuit for adding said $S_1$ to said $T^{i-7}S_2$.

* * * * *